United States Patent
Tamekuni et al.

(10) Patent No.: US 7,307,599 B2
(45) Date of Patent: Dec. 11, 2007

(54) DISPLAY APPARATUS

(75) Inventors: Yasuhiro Tamekuni, Hiratsuka (JP);
Akihiro Fujiwara, Yokohama (JP);
Tsuyoshi Morofuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 10/631,935

(22) Filed: Jul. 31, 2003

(65) Prior Publication Data

US 2004/0025175 A1  Feb. 5, 2004

Related U.S. Application Data

(62) Division of application No. 08/864,335, filed on May 28, 1997, now Pat. No. 6,630,914.

(30) Foreign Application Priority Data

Jun. 3, 1996 (JP) .................................. 8-162428

(51) Int. Cl.
*G09G 5/00* (2006.01)
(52) U.S. Cl. .................. 345/8; 345/9; 345/51; 345/53; 345/102
(58) Field of Classification Search ............... 345/8, 345/9, 51, 53, 102
See application file for complete search history.

(56) References Cited

U.S. PATENT DOCUMENTS 5,479,224 A  12/1995  Yagusaki et al.
5,640,171 A * 6/1997  Shimada ...................... 345/8
5,810,665 A * 9/1998  Takemoto et al. ............ 463/31
5,864,346 A * 1/1999  Yokoi et al. ................. 345/501

FOREIGN PATENT DOCUMENTS

| JP | S63-278092 | | 11/1988 |
| JP | 04-314221 A | * | 11/1992 |
| JP | H06-052288 | | 7/1994 |
| JP | H06-194598 | | 7/1994 |
| JP | H06-304334 | | 11/1994 |
| JP | H07-202769 | | 4/1995 |
| JP | H07-146730 | | 6/1995 |
| JP | H08-140115 | | 5/1996 |

* cited by examiner

*Primary Examiner*—Richard Hjerpe
*Assistant Examiner*—Leonid Shapiro
(74) *Attorney, Agent, or Firm*—Cowen, Liebowitz & Latman, P.C.

(57) ABSTRACT

A display apparatus includes a display unit, a time setting unit, a detection unit and an image changing unit. The display unit is configured to display a color image. The time setting unit is configured to set a time. The time to be set by the time setting unit can be changed by a user. The detection unit is configured to detect whether the time set by the time setting unit is passed. The image changing unit is configured to change a color image to be displayed on the display unit to a monochrome image so as to warn the user that the time set by the time setting unit is passed, if the detection unit detects that the time set by the time setting unit is passed.

8 Claims, 19 Drawing Sheets

DISPLAY APPARATUS

CROSS-REFERENCE TO RELATED APPLICATIONS

This application is a divisional of application Ser. No. 08/864,335, filed May 28, 1997 now U.S. Pat. No. 6,630,914.

BACKGROUND OF THE INVENTION

1. Field of the Invention

The present invention relates to a so-called head-mounted type of display apparatus (head-mounted display) which permits a user to view a display image with the display apparatus being mounted on a predetermined portion of the user, such as the head or the face.

2. Description of Related Art

Conventionally, this kind of display apparatus has not had the function of informing a user himself/herself how long the user has been using the display apparatus.

In recent years, this kind of display apparatus has been used in more and more applications which enable users to view images or the like. Computer games are the most popular of such applications. Unlike normal television screens, this kind of display apparatus can easily create a closed space, so that a user can be more deeply immersed in the world of a game. Furthermore, such a display apparatus is provided with a head detecting device for detecting the motion of the head of the user, and can realize virtual reality (VR) by varying a display image according to the detection value of the head detecting device. This kind of display apparatus can also be used as a computer display. The use of the display apparatus enables a user to operate a computer anywhere without the need to use a large CRT display and without worrying whether someone is peeping at the user's display.

This kind of display apparatus using a small liquid crystal display panel is arranged as shown in FIG. 1. In the arrangement shown in FIG. 1, light emitted from a backlight 1902 passes through a display 1901 such as a liquid crystal display panel, and is made incident on an entrance surface 1900a of an optical element 1900. The light passing through the entrance surface 1900a is made incident on a reflecting surface 1900b of the optical element 1900 at an angle of incidence not less than a critical angle and is totally reflected from the reflecting surface 1900b toward a total reflection surface 1900c of the optical element 1900. The light is again totally reflected by the total reflection surface 1900c and is made incident on the reflecting surface 1900b at an angle of incidence not greater than the critical angle. The light incident at the angle of incidence not greater than the critical angle is conducted to a pupil 1908 of a user and an image is displayed by the display 1901, so that the user can view the displayed image.

However, the above-described conventional apparatus has the problem that a user may continuously use the display apparatus over a long time without noticing the lapse of use time.

In addition, the conventional display which is used as display means for a game or a computer has the problem that a user often tends to immerse himself/herself in a display picture and continuously wear the display apparatus over a long time, as well as the problem that it is troublesome for the user to frequently put on and take off the display apparatus.

Furthermore, regarding the display apparatus shown in FIG. 1, the user may continuously use the display apparatus over a long time without noticing the lapse of use time. Although there is a method of displaying clock information in the display 1901 to prevent this problem, this method may not agree with the intention of the user, because the display apparatus is intended to create virtual reality.

BRIEF SUMMARY OF THE INVENTION

It is, therefore, an object of the present invention to provide a display apparatus capable of solving the above-described problems.

Another object of the present invention is to provide a display apparatus capable of preventing a user from continuously using the display apparatus over a long time without noticing elapsed time.

To achieve the above objects, according to one aspect of the present invention, there is provided a display apparatus which visibly displays a video image represented by an input video signal, in the state of being mounted on a predetermined portion of a user, and which comprises video image displaying means for displaying the video image, video image display driving means for causing the video image displaying means to display the video image, optical system means for conducting the video image displayed by the video image displaying means to a pupil of the user, use time setting means for setting a use time, the use time setting means being capable of setting an arbitrary time, and informing means for measuring a continuous use time of the display apparatus and, immediately before an end of the use time set by the use time setting means, informing the user that the use time will end shortly, or, immediately after the end of the use time set by the use time setting means, informing the user that the use time has ended.

Another object of the present invention is to provide a display apparatus which a user can continuously use for only a required time while recognizing the lapse of time.

To achieve the above object, according to another aspect of the present invention, there is provided a display apparatus which visibly displays a video image represented by an input video signal, in the state of being mounted on a predetermined portion of a user, and which comprises video image displaying means for displaying the video image, video image display driving means for causing the video image displaying means to display the video image, optical system means for conducting the video image displayed by the video image displaying means to a pupil of the user, use time setting means for setting a use time, the use time setting means being capable of setting an arbitrary time, and control means arranged to measure a continuous use time of the display apparatus and, immediately before an end of the use time set by the use time setting means, inform the user that the use time will end shortly, or, immediately after the end of the use time set by the use time setting means, inform the user that the use time has ended, and arranged to permit resetting for extending the use time set by the use time setting means according to a request of the user.

Another object of the present invention is to provide a display apparatus which does not at all force a user to perform the complicated operation of newly setting use time each time the user uses the display apparatus, and also which enables use time to be set to an arbitrary time according to the request of the user.

To achieve the above object, according to another aspect of the present invention, there is provided a display apparatus which visibly displays a video image represented by an input video signal, in the state of being mounted on a predetermined portion of a user, and which comprises video image displaying means for displaying the video image, video image display driving means for causing the video image displaying means to display the video image, optical system means for conducting the video image displayed by the video image displaying means to a pupil of the user, use time setting means for setting a use time, the use time setting means being capable of setting an arbitrary time, use time indicating means for indicating a predetermined use time which is preset, and informing means for starting measurement of a continuous use time of the display apparatus when a power source thereof is turned on, and, immediately before an end of the predetermined use time indicated by the use time indicating means, informing the user that the use time will end shortly, or, immediately after the end of the predetermined use time indicated by the use time indicating means, informing the user that the use time has ended, the informing means, if the use time is set by the use time setting means after the power source of the display apparatus is turned on, informing the user that the use time will end shortly, immediately before an end of the use time set by the use time setting means, or informing the user that the use time has ended, immediately after the end of the use time set by the use time setting means.

Another object of the present invention is to provide a display apparatus which can prevent a user from continuously using the display apparatus for a long time.

To achieve the above object, according to another aspect of the present invention, there is provided a display apparatus which visibly displays a video image represented by an input video signal, in the state of being mounted on a predetermined portion of a user, and which comprises video image displaying means for displaying the video image, video image display driving means for causing the video image displaying means to display the video image, optical system means for conducting the video image displayed by the video image displaying means to a pupil of the user, time measuring means for measuring time which elapses after a predetermined timing, and outputting an information signal relative to the measured time, and display operation control means for controlling a state of display of the video image in the video image displaying means according to a content represented by the information signal outputted from the time measuring means.

Yet another object of the present invention is to provide a display apparatus which can inform a user of the elapsed time of continuous use and warn the user of continuous long-time use.

To achieve the above object, according to another aspect of the present invention, there is provided a display apparatus which visibly displays a video image represented by an input video signal, in the state of being mounted on a predetermined portion of a user, and which comprises video image displaying means having a plurality of different kinds of video image display modes, for displaying the video image in accordance with any of the video image display modes, video image display driving means for causing the video image displaying means to display the video image, optical system means for conducting the video image displayed by the video image displaying means to a pupil of the user, use time setting means for setting a use time, the use time setting means being capable of setting an arbitrary time, and display mode setting means for setting a video image display mode in the video image displaying means according to a state of lapse of the use time set by the use time setting means.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below with reference to FIGS. 2 to 19.

First Embodiment

Figure 2:
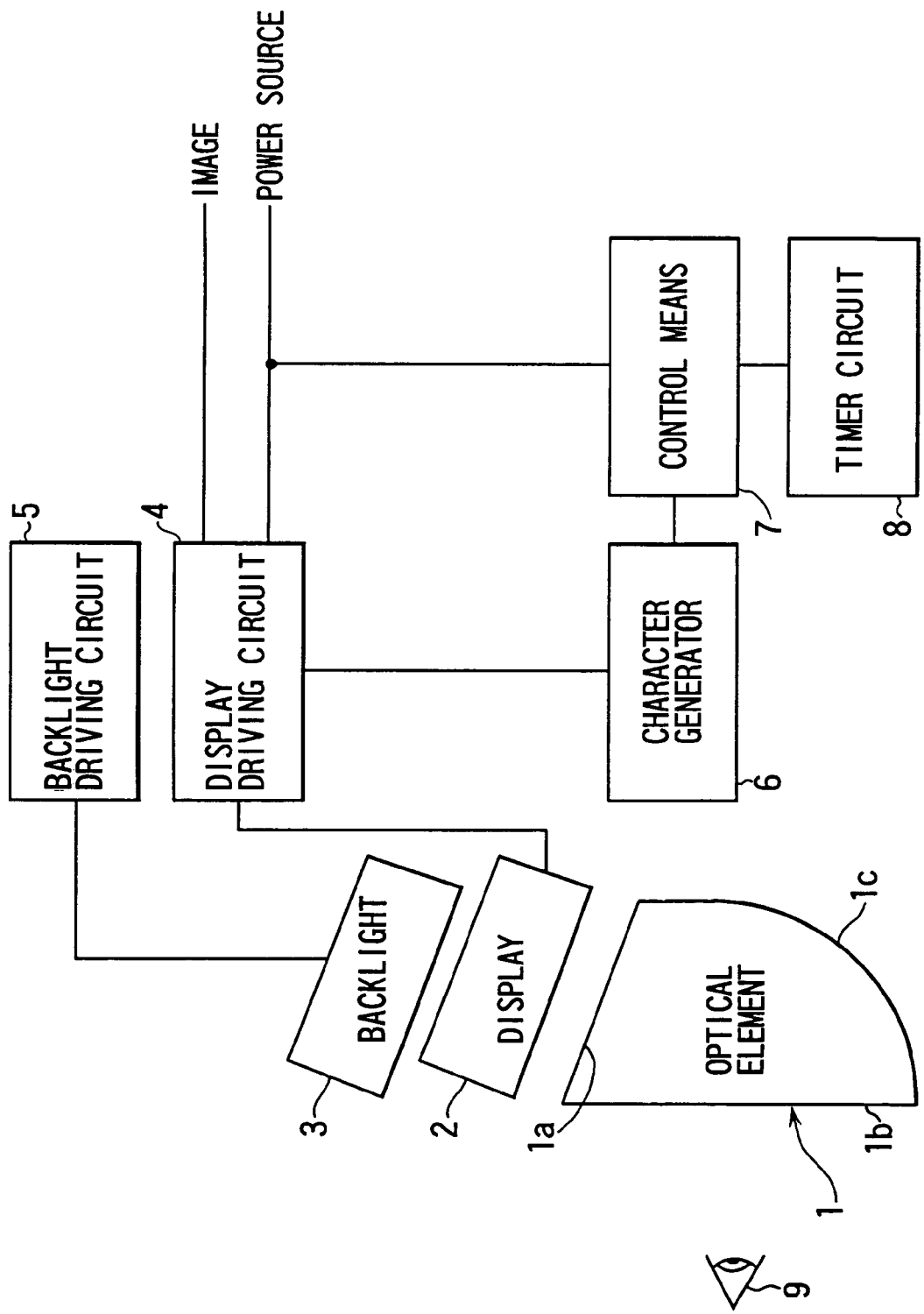
FIG. 2 is a block diagram showing the arrangement of a head-mounted type of display apparatus according to a first embodiment of the present invention.

A first embodiment of the present invention will be described below with reference to FIGS. 2 to 5. FIG. 2 is a block diagram showing the arrangement of a display apparatus (head-mounted display apparatus) according to the first embodiment of the present invention. The arrangement shown in FIG. 2 includes an optical element 1, a display 2 such as a liquid crystal display (liquid crystal display panel), a backlight 3, a display driving circuit 4, a backlight driving circuit 5, a character generator 6, control means 7 such as a microcomputer, and a timer circuit 8. Reference numeral 9 denotes a pupil of a user. Although an illustration is omitted for the sake of simplicity, the user has a pair of right and left pupils, and the optical element 1, the display 2, the backlight 3, the display driving circuit 4 and the backlight driving circuit 5 are provided in pairs each.

Figure 3:
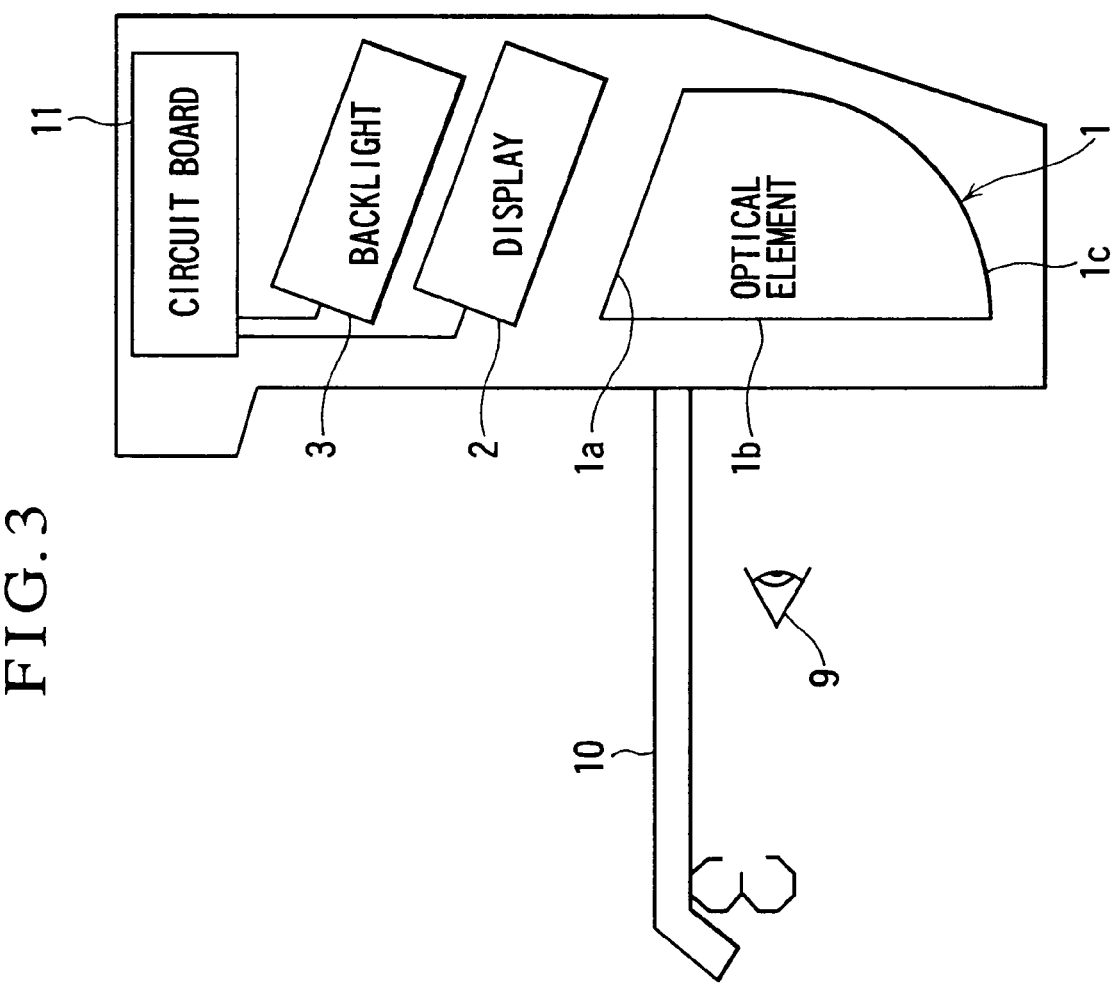
FIG. 3 is a schematic side view showing the arrangement of the apparatus shown in FIG. 2.

The optical element 1, the display 2, the backlight 3, the display driving circuit 4, the backlight driving circuit 5, the character generator 6, the control means 7 and the timer circuit 8 are mounted on a predetermined portion of the user, for example, the head, with a mounting member 10 as shown in FIG. 3 by way of example. As shown in FIG. 3, the circuits 4, 5, 6, 7, 8 and so on are included in a circuit board 11.

Referring back to FIG. 2, an image is displayed on the display 2 by the character generator 6 and the display driving circuit 4. In addition, the light emitted from the backlight 3 which is lit by the backlight driving circuit 5 passes through the display 2 and is made incident on an entrance surface 1a of the optical element 1. The light which has passed through the entrance surface 1a is made incident on a reflecting surface 1b of the optical element 1 at an angle of incidence not less than a critical angle, and is totally reflected from the reflecting surface 1b toward a total reflection surface 1c of the optical element 1. The light is again totally reflected from the total reflection surface 1c and is made incident on the reflecting surface 1b at an angle of incidence not greater than the critical angle. The light incident at the angle of incidence not greater than the critical angle is conducted to the pupil 9 of the user, so that the user can view the image displayed on the display 2.

Figure 4:
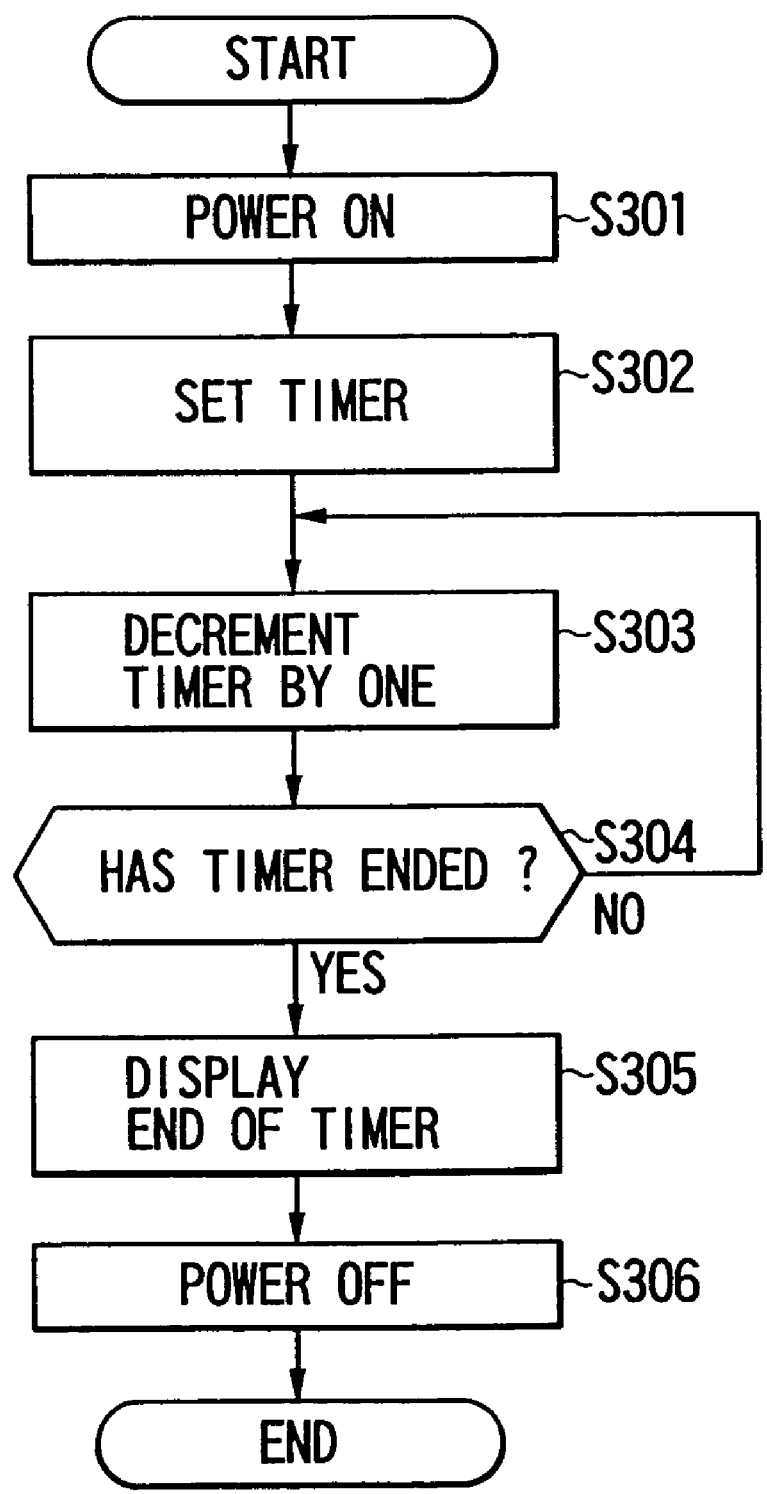
FIG. 4 is a flowchart showing the program of a control operation of the apparatus shown in FIG. 2.

The operation of the display apparatus having the above-described arrangement according to the first embodiment will be described below with reference to the flowchart of FIG. 4.

Figure 5:
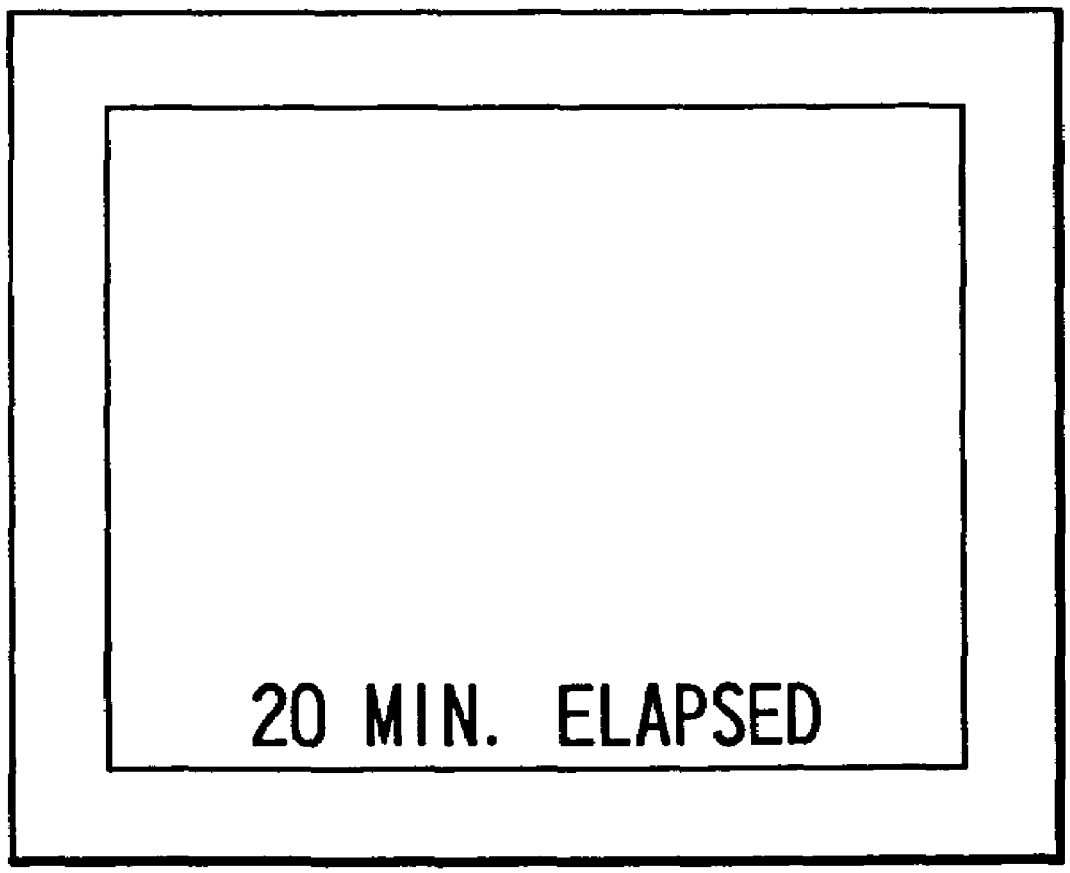
FIG. 5 is a view showing a display example of the apparatus shown in FIG. 2.

First, in Step S301, the user turns on the power source of the display apparatus, and, in Step S302, operates the timer circuit 8 to set an arbitrary time (timer time). Then, in Step S303, the timer circuit 8 starts its timer operation, and, in the next step S304, the control means 7 determines whether the timer time set in Step S302 has ended. If the timer time has not yet ended, the process returns to Step S303, whereas if the timer time has ended, the process proceeds to Step S305, in which the display 2 is made to provide a visual display indicative of the end of the timer time. This visual display may be represented in the form of characters such as "20 MINUTES ELAPSED", as shown in FIG. 5 by way of example, or in other arbitrary forms which can be recognized by the user.

After the end of the above-described display processing, the user turns off the power source in Step S306 and the process is brought to an end.

In the first embodiment, although the display 2 is made to provide the visual display indicative of the end of the timer time, the visual display is not limited to such a content. For example, the display 2 may be made to provide a visual display indicating that the current elapsed time is immediately before the end of the set timer time. The character generator 6, the control means 7 and the timer circuit 8 may be disposed at a location other than the head-mounted portion of the display apparatus. Furthermore, the display apparatus may be arranged to automatically turn off the power source if the display apparatus continues to be used after the visual display indicative of the lapse of the timer time has been provided for a predetermined time. Furthermore, the display apparatus may be arranged so that the timer time can be extended to provide a visual display indicating how many times the time timer set by the user operating the timer circuit 8 has ended, or a visual display indicative of the total time for which the display apparatus has been used.

Second Embodiment

Figure 1:
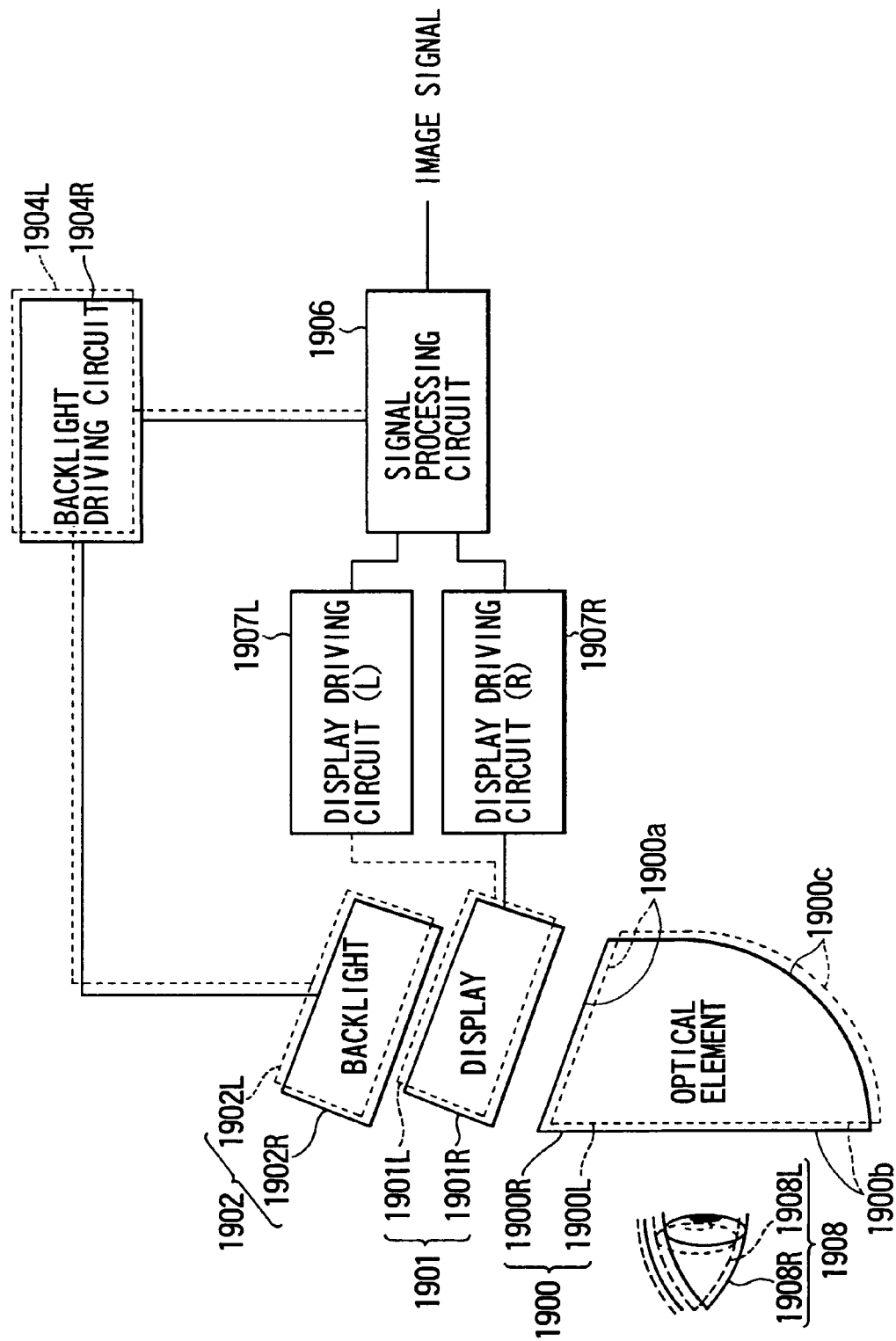
FIG. 1 is a block diagram showing the arrangement of a conventional head-mounted type of display apparatus.
Figure 6:
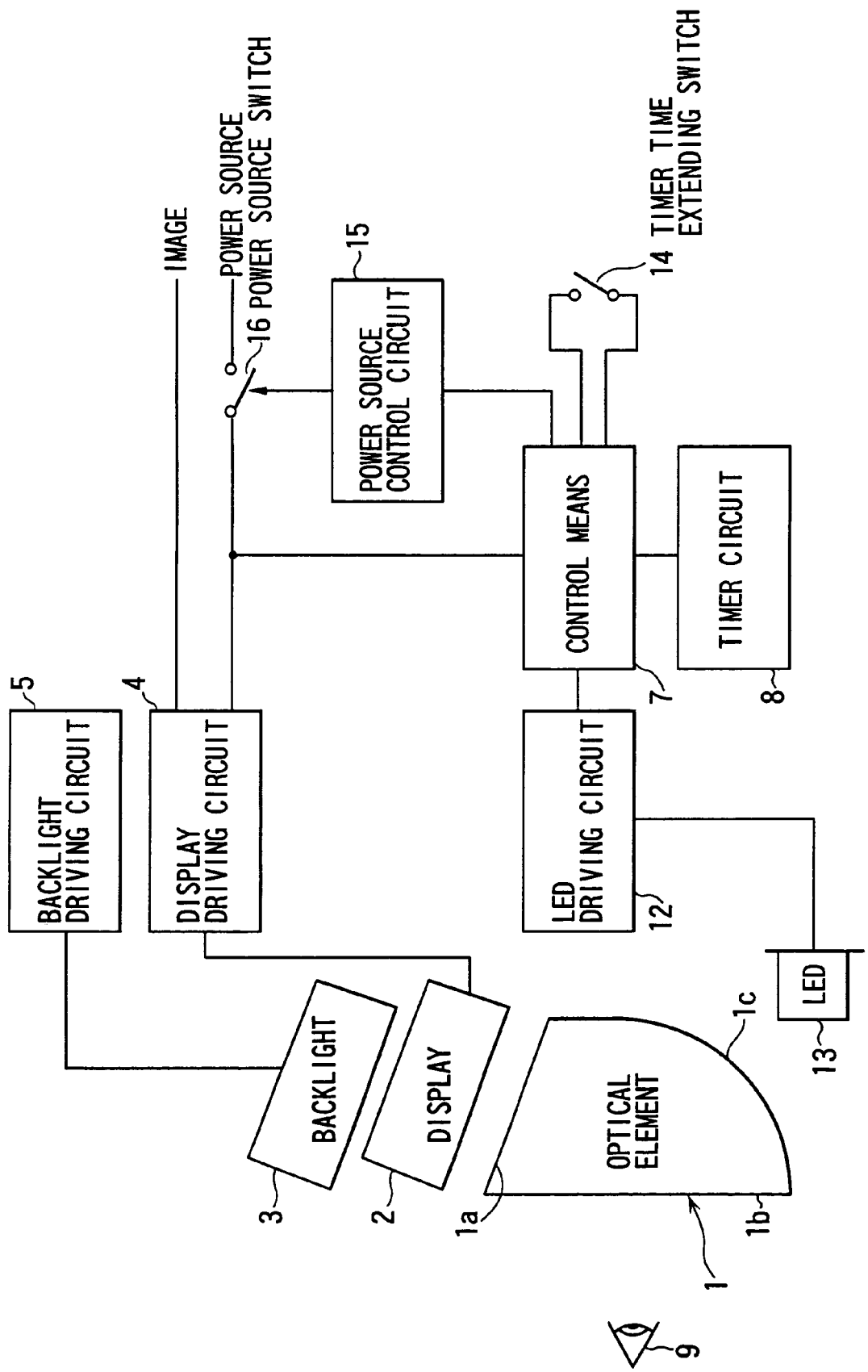
FIG. 6 is a block diagram showing the arrangement of a head-mounted type of display apparatus according to a second embodiment of the present invention.
Figure 7:
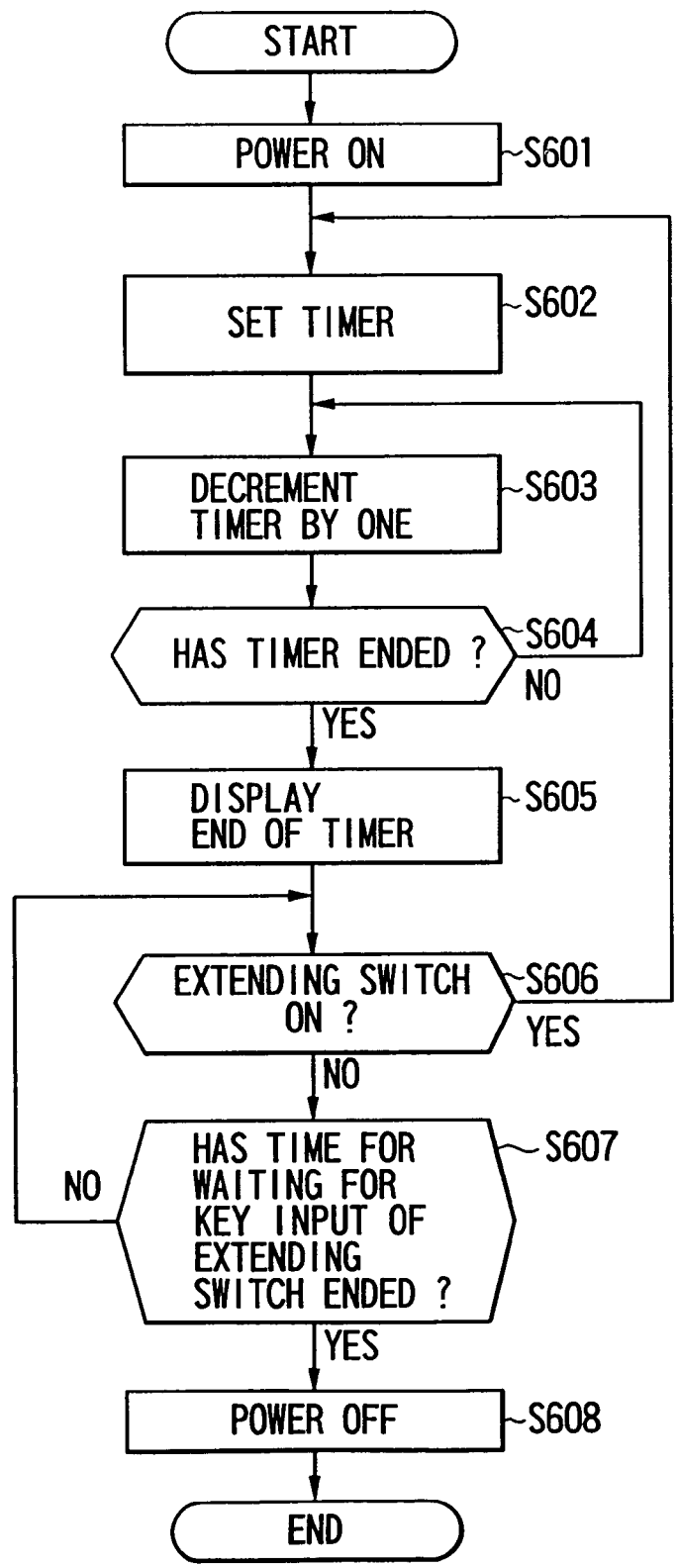
FIG. 7 is a flowchart showing the program of a control operation of the apparatus shown in FIG. 6.
Figure 8:
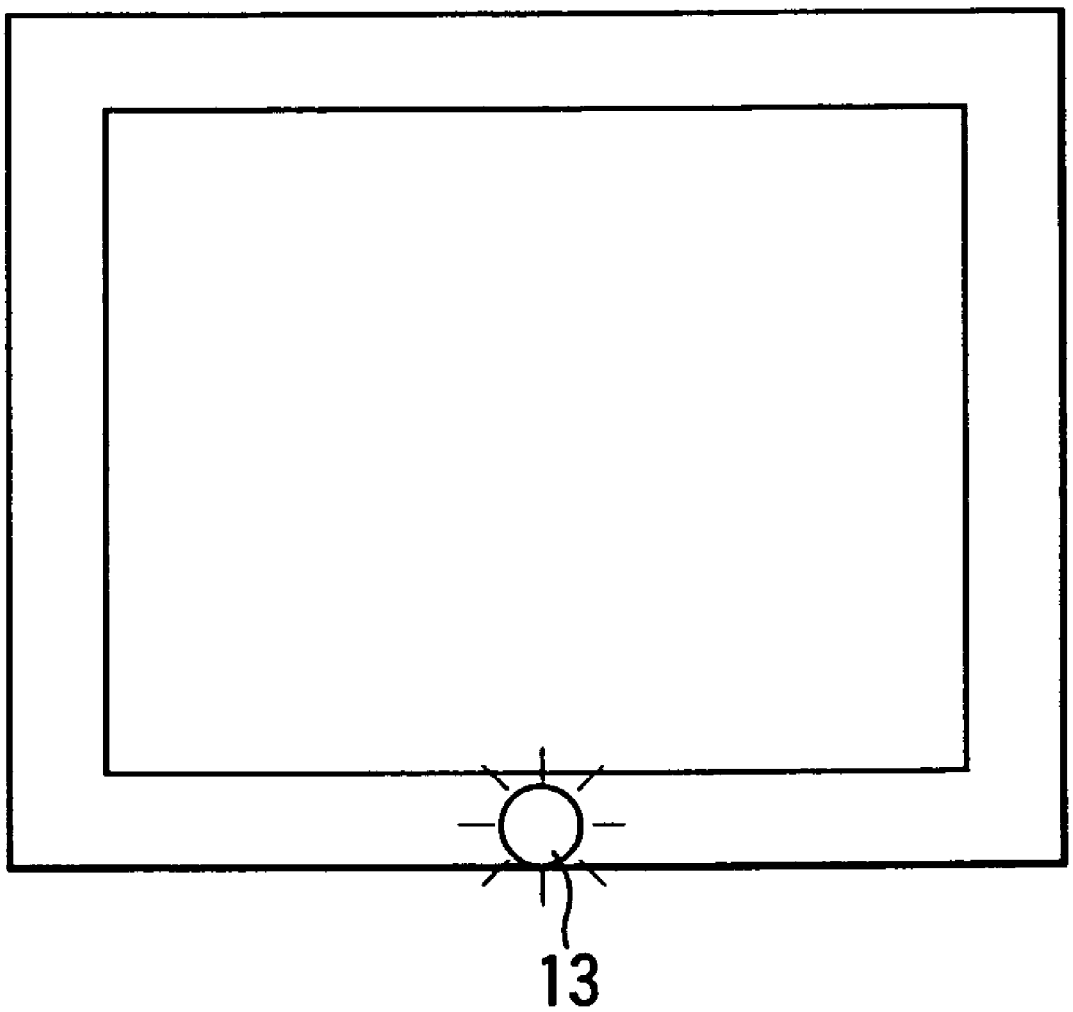
FIG. 8 is a view showing a display example of the apparatus shown in FIG. 6.

A second embodiment of the present invention will be described below with reference to FIGS. 6 to 8. FIG. 6 is a block diagram showing the arrangement of a display apparatus according to the second embodiment of the present invention. In FIG. 2, identical reference numerals are used to denote parts identical to those of the first embodiment shown in FIG. 1. The arrangement of FIG. 6 differs that of FIG. 2 in that an LED driving circuit 12, an LED 13, a timer time extending switch 14, a power source control circuit 15 and a power source switch 16 are added to the arrangement of FIG. 2, and the second embodiment is arranged to inform the user of the lapse of the timer time set by the user operating the timer circuit 8, by lighting the LED 13 by means of the LED driving circuit 12 as shown in FIG. 8.

Furthermore, the second embodiment shown in FIG. 6 is arranged so that the power source control circuit 15 automatically turns off the power source switch 16 after the timer time set by the user operating the timer circuit 8 has ended and the display 2 has provided a predetermined display.

Furthermore, the second embodiment is arranged so that if the user operates the timer time extending switch 14, for example, within a predetermined time after a visual display indicative of the lapse of the timer time set by the user operating the timer circuit 8 has been provided, the timer time is extended and the execution of the operation of automatically turning off the power source is postponed.

The operation of the display apparatus having the above-described arrangement according to the second embodiment will be described below with reference to the flowchart of FIG. 7.

First, in Step S601, the user turns on the power source of the display apparatus, and, in Step S602, operates the timer circuit 8 to set an arbitrary timer time. Then, in Step S603, the timer circuit 8 starts its timer operation, and, in the next step S604, the control means 7 determines whether the timer time set in Step S602 has ended. If the timer time has not yet ended, the process returns to Step S603, whereas if the timer time has ended, the process proceeds to Step S605, in which the display 2 is made to provide a visual display indicative of the end of the timer time. This visual display is provided by lighting the LED 13 by means of the LED driving circuit 12, as shown in FIG. 8 by way of example.

Then, in Step S606, the control means 7 determines whether the timer time extending switch 14 has been pressed. If the timer time extending switch 14 has been pressed, the process returns to Step S602, in which the user operates the timer circuit 8 to set an arbitrary timer time. If the timer time extending switch 14 has not yet been pressed in Step S606, the process proceeds to Step S607, in which the control means 7 determines whether a key input wait time to wait for a key input from the timer time extending switch 14 has ended. If the key input wait time has not yet ended, the process returns to Step S606, whereas if the key input wait time has ended, the power source is turned off in Step S608 and the process is brought to an end.

In the second embodiment, the LED 13 may be lit in such a manner that the LED 13 is blinked once at the first time that the timer time set by the user operating the timer circuit 8 has ended, and, if the set timer time is extended, the LED 13 is blinked again at the time of the end of the extended timer time, for example, twice at the time of the end of the second timer time. Otherwise, the display apparatus may also be arranged to provide a visual display indicative of the total time for which the display apparatus has been used.

Third Embodiment

Figure 9:
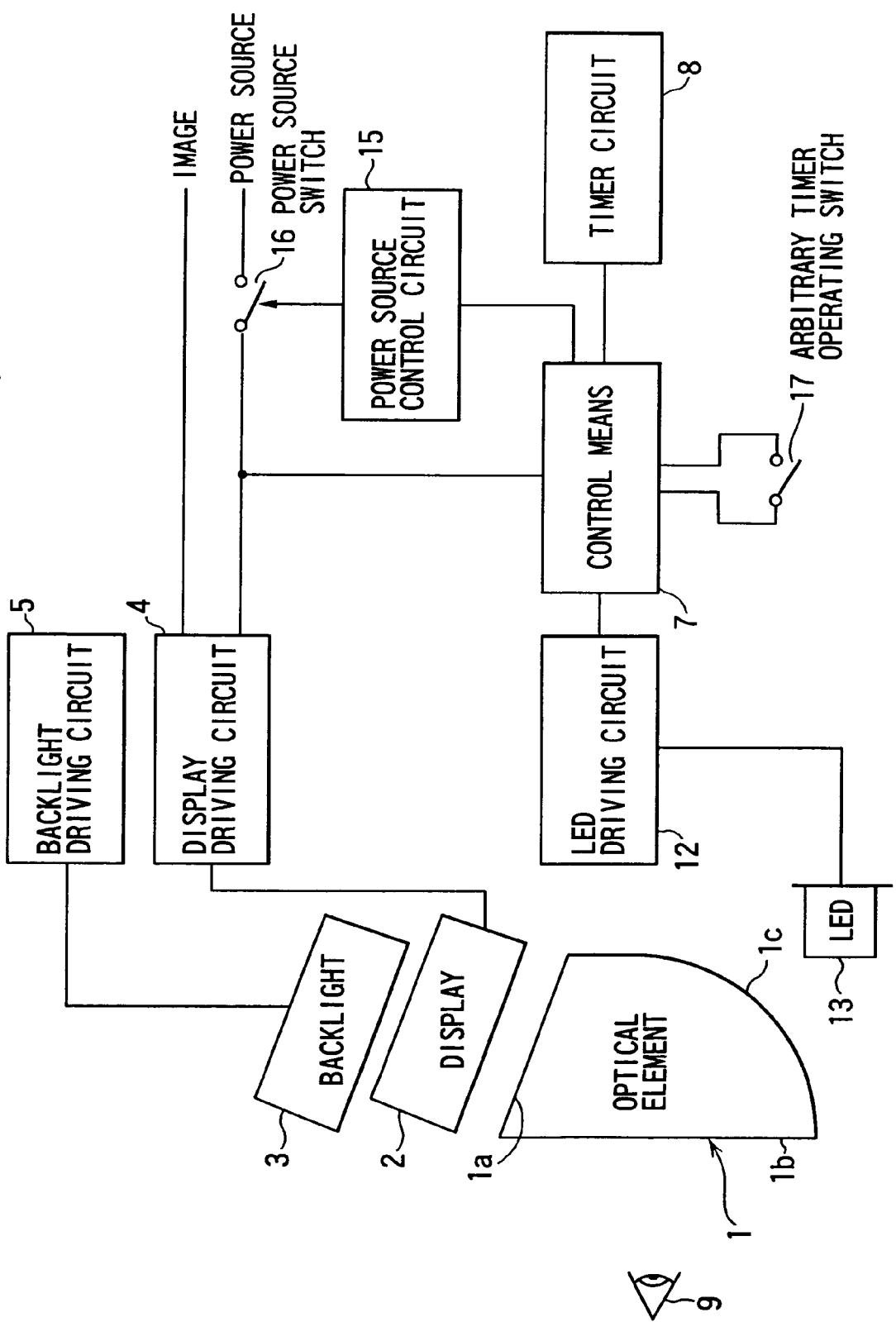
FIG. 9 is a block diagram showing the arrangement of a head-mounted type of display apparatus according to a third embodiment of the present invention.
Figure 10:
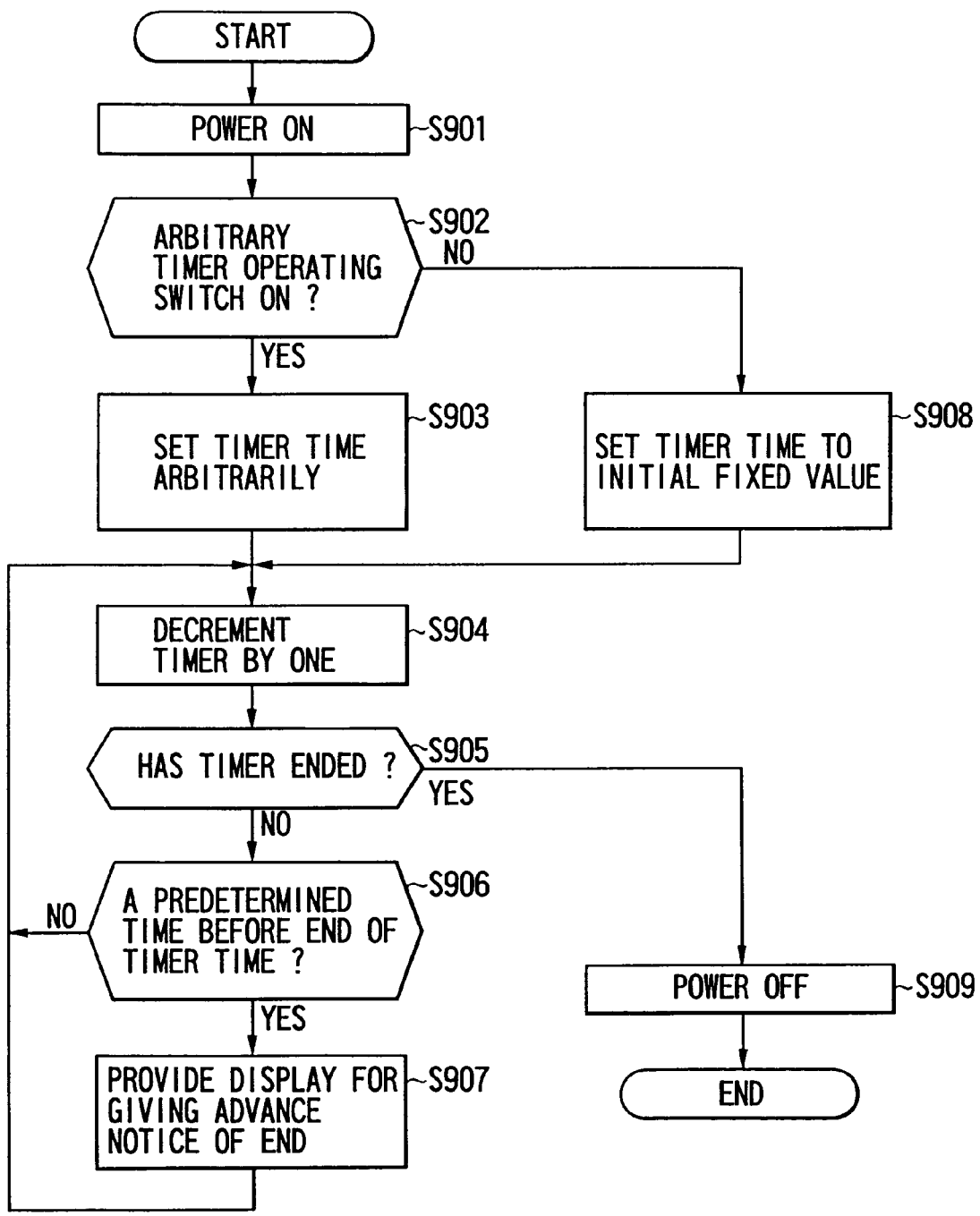
FIG. 10 is a flowchart showing the program of a control operation of the apparatus shown in FIG. 9.

A third embodiment of the present invention will be described below with reference to FIGS. 9 and 10. FIG. 9 is a block diagram showing the arrangement of a display apparatus according to the third embodiment of the present invention. In FIG. 9, identical reference numerals are used to denote parts identical to those of the second embodiment shown in FIG. 6. The arrangement of FIG. 9 differs that of FIG. 6 in that an arbitrary timer operating switch 17 is provided in place of the timer time extending switch 14 in the arrangement of FIG. 6.

If the user turns on the power source switch 16 while operating the arbitrary timer operating switch 17, or if the user operates the arbitrary timer operating switch 17 immediately after turning on the power source switch 16, the user can arbitrarily select a timer time to be set. If such an operation is not performed, the timer time preset by the timer circuit 8 is set to a predetermined preset time.

The operation of the display apparatus according to the third embodiment will be described below with reference to the flowchart of FIG. 10.

First, in Step S901, the user turns on the power source of the display apparatus. Immediately after that, in Step S902, the control means 7 determines whether the arbitrary timer operating switch 17 has been operated. If the arbitrary timer operating switch 17 has been operated, the process proceeds to Step S903, in which the user sets the timer time to an arbitrary time, and then proceeds to Step S904. If the arbitrary timer operating switch 17 has not been operated, the process proceeds to Step S908, in which the timer time is set to an initial fixed value, and then proceeds to Step S904.

In Step S904, the timer circuit 8 starts a predetermined counting operation. Then, in Step S905, the control means 7 determines whether the set timer time has ended. If the set timer time has not yet ended, the process proceeds to Step S906, in which the control means 7 determines whether the current elapsed time is a predetermined time before the end of the timer time. If the current elapsed time is not the predetermined time before the end of the timer time, the process returns to Step S904, whereas if the current elapsed time is the predetermined time before the end of the timer time, the process proceeds to Step S907, in which a visual display indicative of notice of the end of the timer time is provided. Then, the process returns to Step S904.

If the control means 7 determines in Step S905 that the timer time has ended, the process proceeds to Step S909, in which the power source is turned off. Then, the process is brought to an end.

In the third embodiment, the preset time to be set if the arbitrary timer operating switch 17 is not operated may use a value which is uniquely determined on a system basis, or the value of an arbitrary time which is selected by the user and is rewritably stored in a memory. Furthermore, as in the above-described second embodiment, a timer time extending switch may also be provided.

Fourth Embodiment

Figure 11:
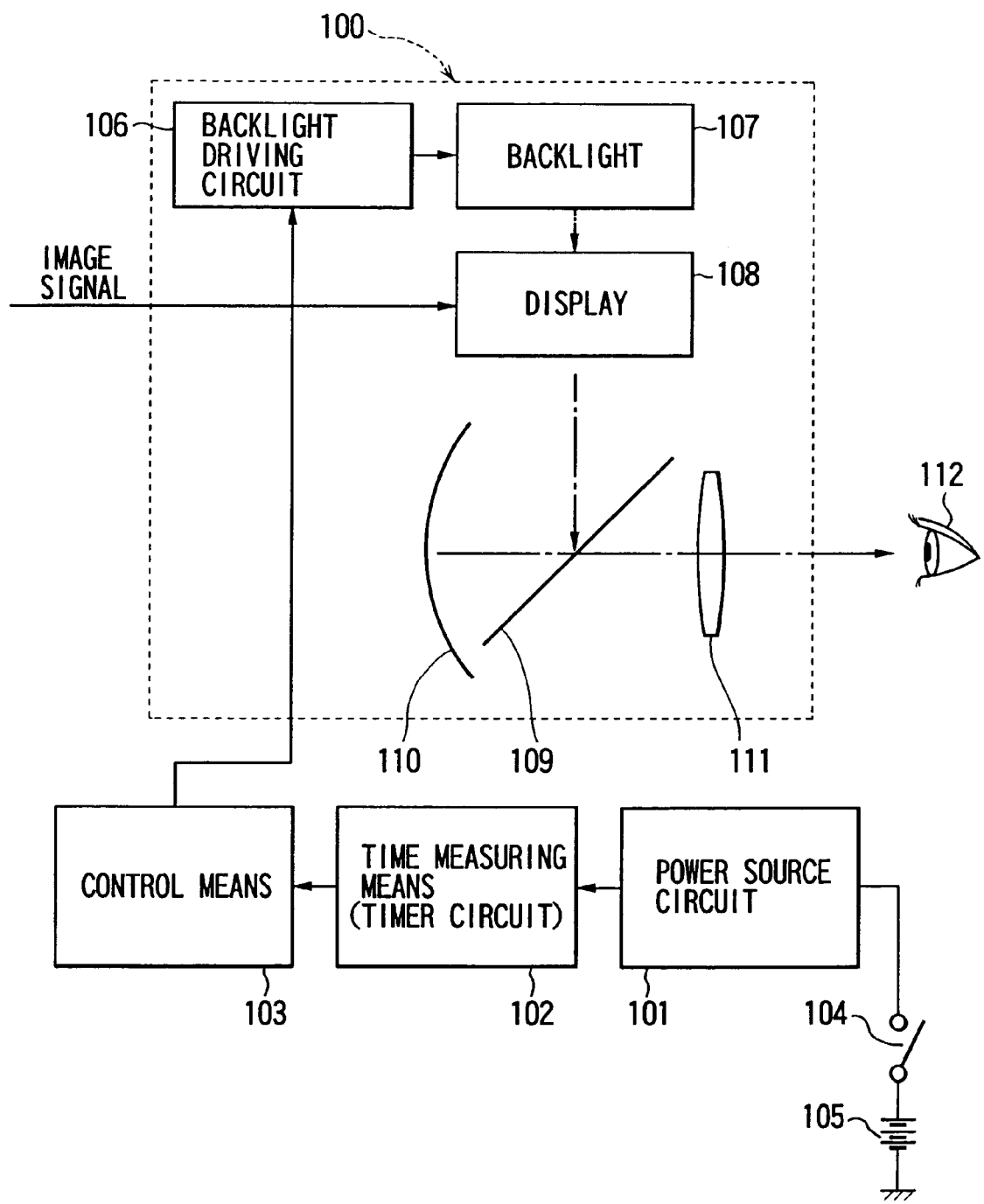
FIG. 11 is a block diagram showing the arrangement of a head-mounted type of display apparatus according to a fourth embodiment of the present invention.

The fourth embodiment of the present invention will be described below with reference to FIGS. 11 to 13. FIG. 11 is a block diagram showing the arrangement of a display apparatus according to the fourth embodiment of the present invention. The arrangement shown in FIG. 11 includes image display means 100 of the display apparatus, a power source circuit 101, time measuring means (timer circuit) 102 and control means 103.

The image display means 100 of the fourth embodiment is of a closed type and includes a backlight driving circuit 106, a backlight 107, a display 108, a half-mirror 109, a concave mirror 110, and an eyepiece lens 111. The image displayed on the display 108 is transmitted to a pupil 112 of a user by the half-mirror 109, the concave mirror 110 and the eyepiece lens 111. The backlight driving circuit 106 serves to light the backlight 107, and the control means 103 is connected to the backlight driving circuit 106. The half-mirror 109 and the concave mirror 110 are disposed between the display 108 and the eyepiece lens 111, so that the entire display apparatus can be made compact with respect to the required optical path length.

The power source circuit 101 is connected to a power source 105 via a power source switch 104. When the power source switch 104 is turned on, the power source circuit 101 supplies the required electrical source power to the entire display apparatus and also gives a trigger signal to the time measuring means 102. The time measuring means 102 starts its time measuring operation on the basis of the trigger signal and serially outputs time information. The control means 103 receives the time information from the time measuring means 102, and outputs a control signal and adjusts the amount of light of the backlight 107 of the image display means 100 via the backlight driving circuit 106. When the time information reaches a predetermined value, the control means 103 varies the control signal to stop or reduce the emission of the backlight 107.

Figure 12:
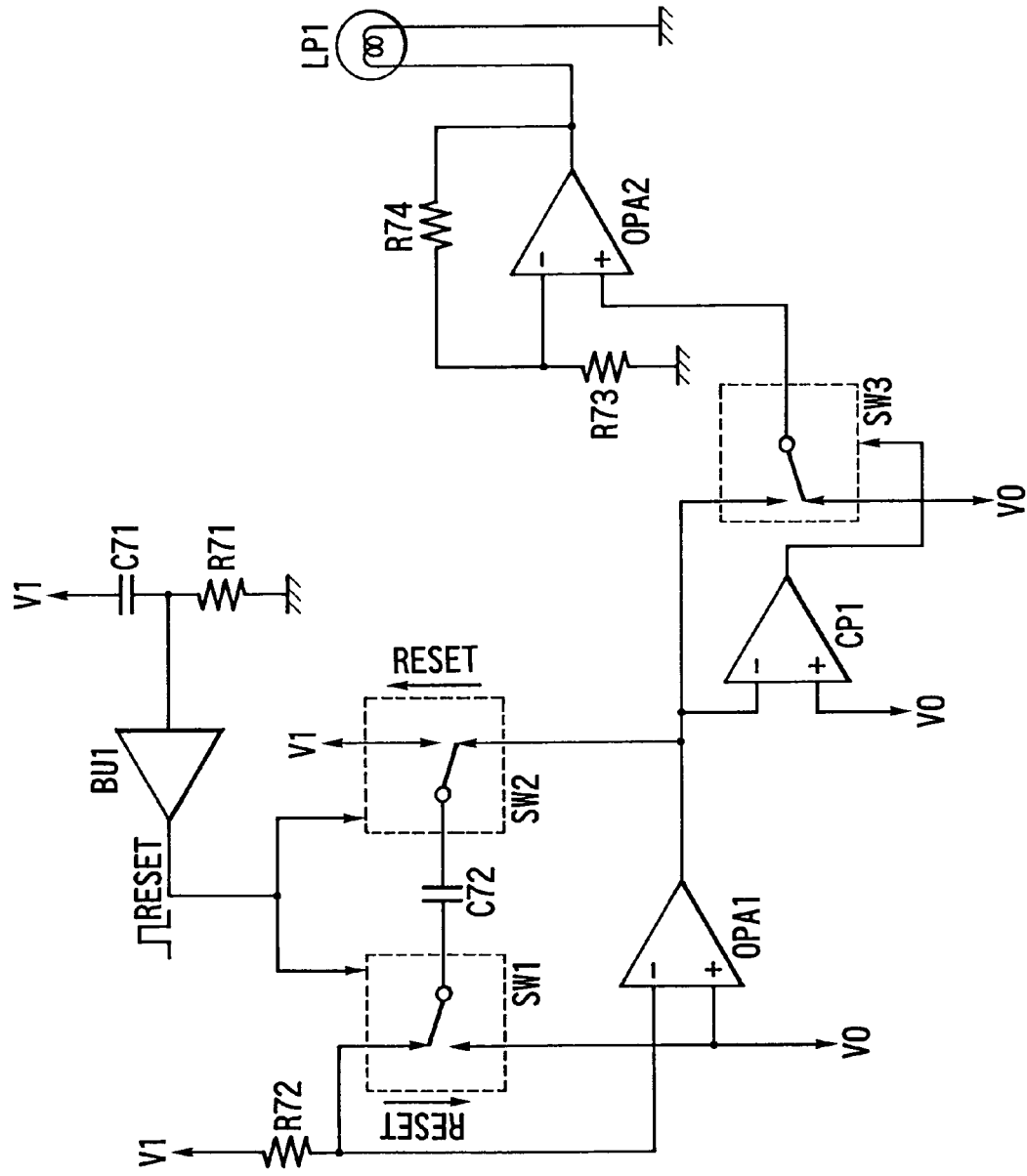
FIG. 12 is a block diagram showing the arrangement of control means and time measuring means in the apparatus shown in FIG. 11.

FIG. 12 is a block diagram showing an analog circuit construction of the time measuring means 102 and the control means 103. This analog circuit, which corresponds to the arrangement shown in FIG. 11, includes time measuring means (102 in FIG. 11) primarily formed by an operational amplifier OPA1, control means (103 in FIG. 11) primarily formed by a comparator CP1, a backlight driving circuit (106 in FIG. 11) primarily formed by an operational amplifier OPA2, and a backlight (107 in FIG. 11) formed by a lamp LP1.

In the analog circuit shown in FIG. 12, first, the power source 105 is turned on to apply a main voltage V1. Then, when the power source 105 is turned on, a positive pulse is instantaneously generated by a differentiation circuit formed by a capacitor C71 and a resistor R71, and a digital buffer circuit BU1 receives the positive pulse and outputs a reset pulse signal RESET. A switch SW1 and a switch SW2 respectively switch over in the directions of the corresponding arrows shown in FIG. 12 in response to the reset pulse signal RESET, and a capacitor C72 is charged with a voltage of V1-V0. The switch SW1 and the switch SW2 are immediately restored to their respective initial states, and the capacitor C72 is connected to the feedback loop of the operational amplifier OPAL. A constant current of (V1-V0)/R72 flows through a resistor R72 to charge the capacitor C72 by a low current. Thus, the output of the operational amplifier OPA1 moderately falls from V1 to 0 (zero) volts. This voltage variation is applied to the negative input terminal of the comparator CP1, and is compared with the voltage V0 applied to the positive input terminal of the comparator CP1.

An elapsed time (t0) after which the falling voltage falls below the comparative voltage is obtained from the following equation (1):

$$t0 = C72 \times R73. \tag{1}$$

When the output of the comparator CP1 is inverted, a switch SW3 switches to the upper side of FIG. 12 and selection is switched from the reference voltage V0 to the output voltage of the operational amplifier OPA1. After that, the output voltage falls to 0 (zero) volts in a predetermined time (t1). This predetermined time (t1) is obtained from the following equation (2):

$$t1 = C72 \times R72 \times V0/(V1-V0). \tag{2}$$

This output voltage is amplified by the operational amplifier OPA2 at an amplification ratio determined by a resistor R73 and a resistor R74, and the resultant electrical power is supplied to the lamp LP1.

Figure 13A:
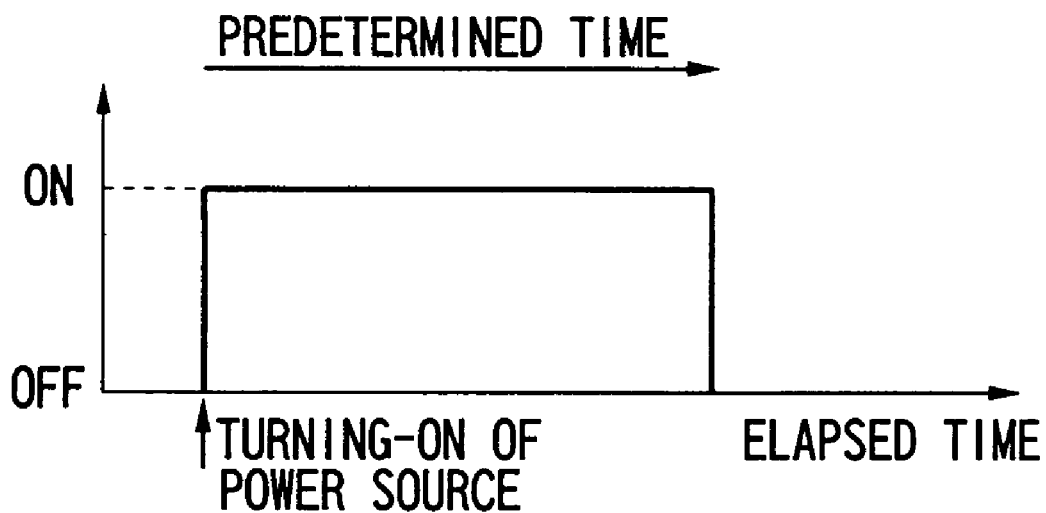
FIGS. 13(a) and 13(b) are views showing the relation between the power-on operation of the apparatus shown in FIG. 11 and elapsed time.
Figure 13B:
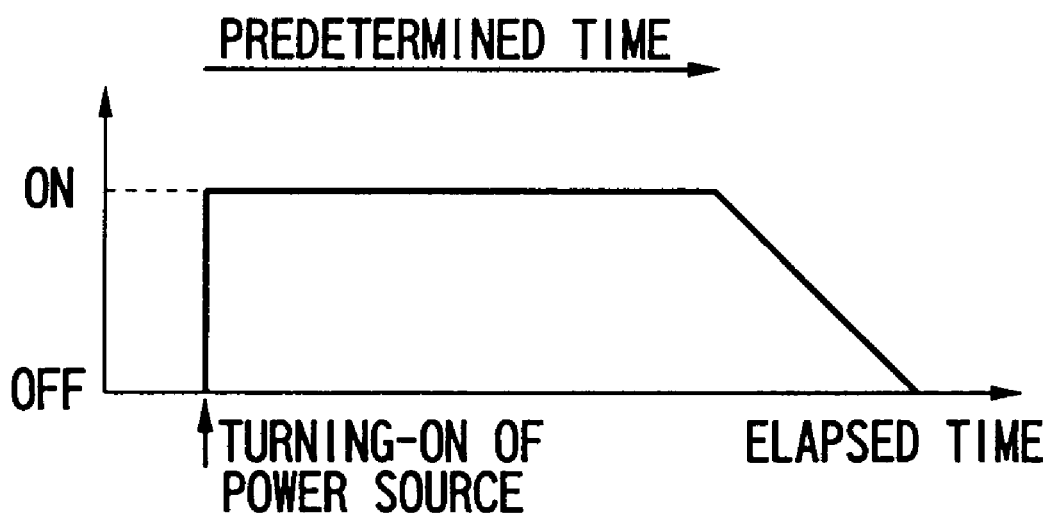

This supplied voltage or current varies as shown in FIG. 13(b). The time measuring means and the control means are readily realized by commercially available monostable multivibrator ICs. The control signal varies as shown in FIG. 13(a).

Incidentally, the time measuring means and the control means are not limited to the aforesaid analog circuit construction, and may also be realized by a digital circuit. The digital circuit is formed by an oscillation circuit (clock) and a counting circuit (counter) having an initializing (reset) input.

In the operation of such digital circuit, when a power source is turned on or when an image display operation is started, an initializing signal is generated to set the value of the counting circuit to a predetermined value. With the lapse of time, the counting circuit proceeds with its counting operation while measuring the frequency of oscillation of the oscillation circuit. When a predetermined time elapses, the count value of the counting circuit reaches a predetermined count value. The control means determines whether the predetermined count value has been reached, and outputs a control signal for stopping the driving of the emission of the backlight. The counting circuit may be of the type which counts up from zero to a finite predetermined value or of the type which counts down from a finite predetermined value to zero. If control means (a microcomputer) for other purposes is available to the digital circuit, the control means may also be made to execute the above-described processing in an interval in its main processing. In this arrangement, since the processing of the fourth embodiment merely includes rough measurement of a long time, such control means can execute the processing without any substantial load.

FIGS. 13(a) and 13(b) are views each of which shows a variation in the amount of light with respect to the lapse of time. FIG. 13(a) shows a case in which the backlight 107 is turned off immediately after the lapse of a predetermined time, and the case of FIG. 13(a) can be realized by a simple arrangement. FIG. 13(b) shows a case in which the emission of the backlight 107 is gradually reduced after the lapse of a predetermined time. In the case of FIG. 13(b), since an image does not suddenly vanish, the user can be made to recognize the lapse of time.

Fifth Embodiment

Figure 14:
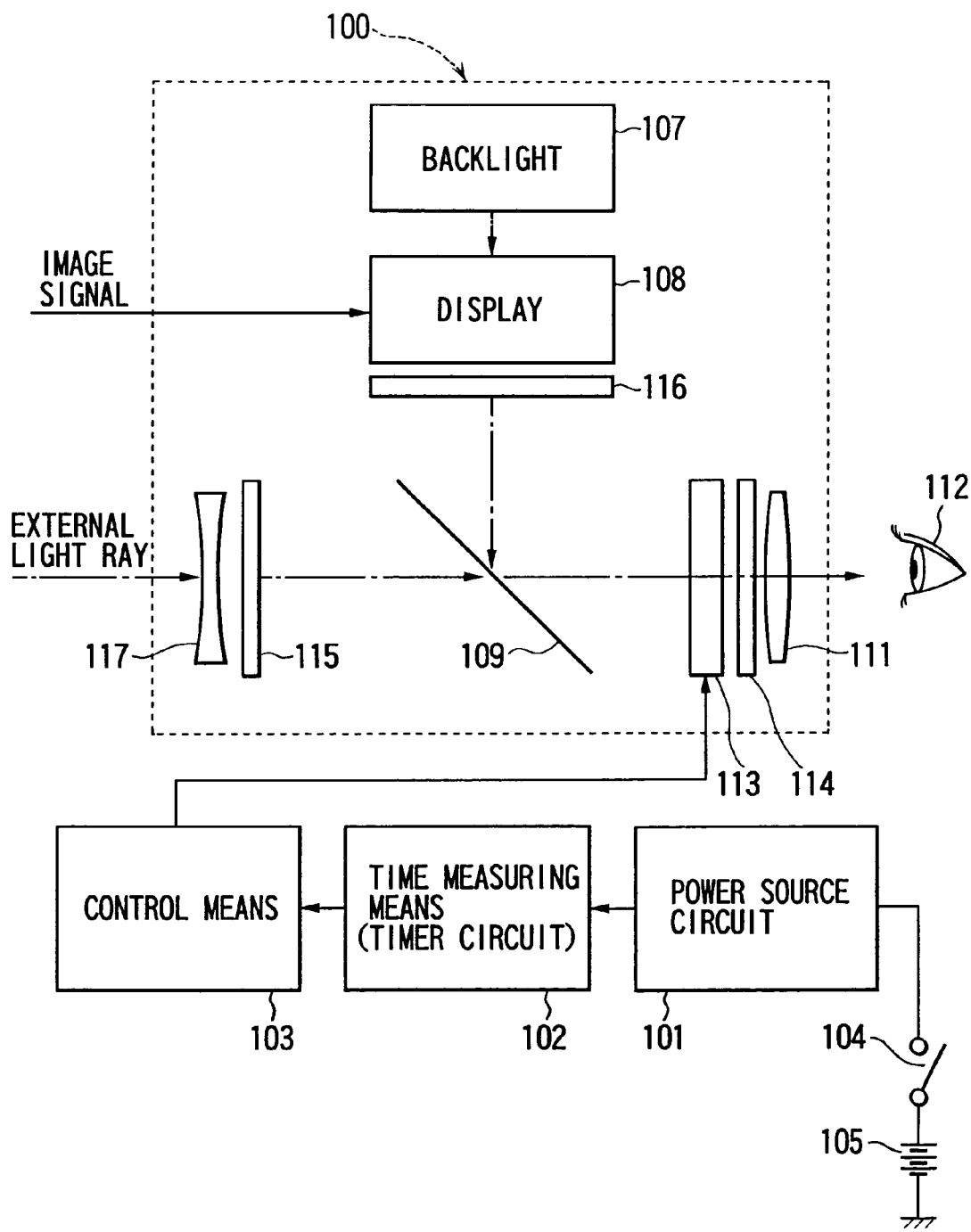
FIG. 14 is a block diagram showing the arrangement of a head-mounted type of display apparatus according to a fifth embodiment of the present invention.

The fifth embodiment of the present invention will be described below with reference to FIG. 14. FIG. 14 is a block diagram showing the arrangement of a display apparatus according to the fifth embodiment of the present invention. In FIG. 14, identical reference numerals are used to denote parts identical to those of the above-described fourth embodiment shown in FIG. 11. The display apparatus according to the fifth embodiment is of an open type. The arrangement shown in FIG. 14 differs from that shown in FIG. 11 in that a small TFT type of liquid crystal display panel is employed as the display 108 and the backlight driving circuit 106 is omitted from the arrangement of FIG. 11, and in that a light controlling display 113 made from a light controlling liquid crystal display panel or the like, three polarizing plates 114, 115 and 116, and a concave lens 117 are provided in the arrangement of FIG. 11.

The light controlling display 113 has a characteristic which exhibits a rotation of 90° in the absence of an electric field, and normally transmits an external light ray and does not transmit a light ray for image display. If an electric field is applied to the light controlling display 113, such polarization is changed to 0 degrees, and the light controlling display 113 brings the external light ray to an untransmitted state, and the light ray for image display to a transmitted state. The first polarizing plate 114 is a vertical polarizing plate and is disposed between the eyepiece lens 111 and the light controlling display 113. The second polarizing plate 115 is a horizontal polarizing plate and is disposed between the half-mirror 109 and the concave lens 117. The third polarizing plate 116 located on an exit side is a vertical polarizing plate and is disposed between the display 108 and the half-mirror 109.

In the arrangement shown in FIG. 14, the backlight 107 illuminates the display 108, and the light passing through the display 108 is deflected by 90 degrees by the half-mirror 109 and enters the pupil 112 of the user through the light controlling display 113, the first polarizing plate 114 and the eyepiece lens 111. Thus, the user can view a display image. In addition, since the half-mirror 109 transmits the external light ray coming from the forward direction, the user can view the outside at the same time. The refraction of the eyepiece lens 111 is cancelled by the second polarizing plate 115 and the concave lens 117 which are disposed on the transmission optical axis of the external light ray, so that the eyepiece lens 111 becomes equivalent to a transparent glass.

The light controlling operation in the arrangement of FIG. 14 will be described below. First, the power source is turned on or an image display operation is started with an electric field being applied to the light controlling display 113, i.e., with a display image being visible. Then, when a predetermined time elapses, the electric field applied to the light controlling display 113 is instantly or gradually cancelled by a control signal supplied from the control means 103, so that the light ray for image display is brought to the untransmitted state and the external light ray to the transmitted state. The control means 103 receives time information from the time measuring means 102, and outputs a control signal and drives the light controlling display 113 to adjust the transmittance thereof. When the time information reaches a predetermined value, the control means 103 varies the control signal and drives the light controlling display 113 so as to decrease the amount of light for image display and increase the amount of external light.

Since the other arrangement of the fifth embodiment and its operation are the same as those of the above-described fourth embodiment, their descriptions are omitted herein. In the fifth embodiment, if the second polarizing plate 115 and the concave lens 117 are omitted and a total reflection mirror is used in place of the half-mirror 109, it is possible to achieve the object of controlling only a light ray for image display.

Sixth Embodiment

Figure 15:
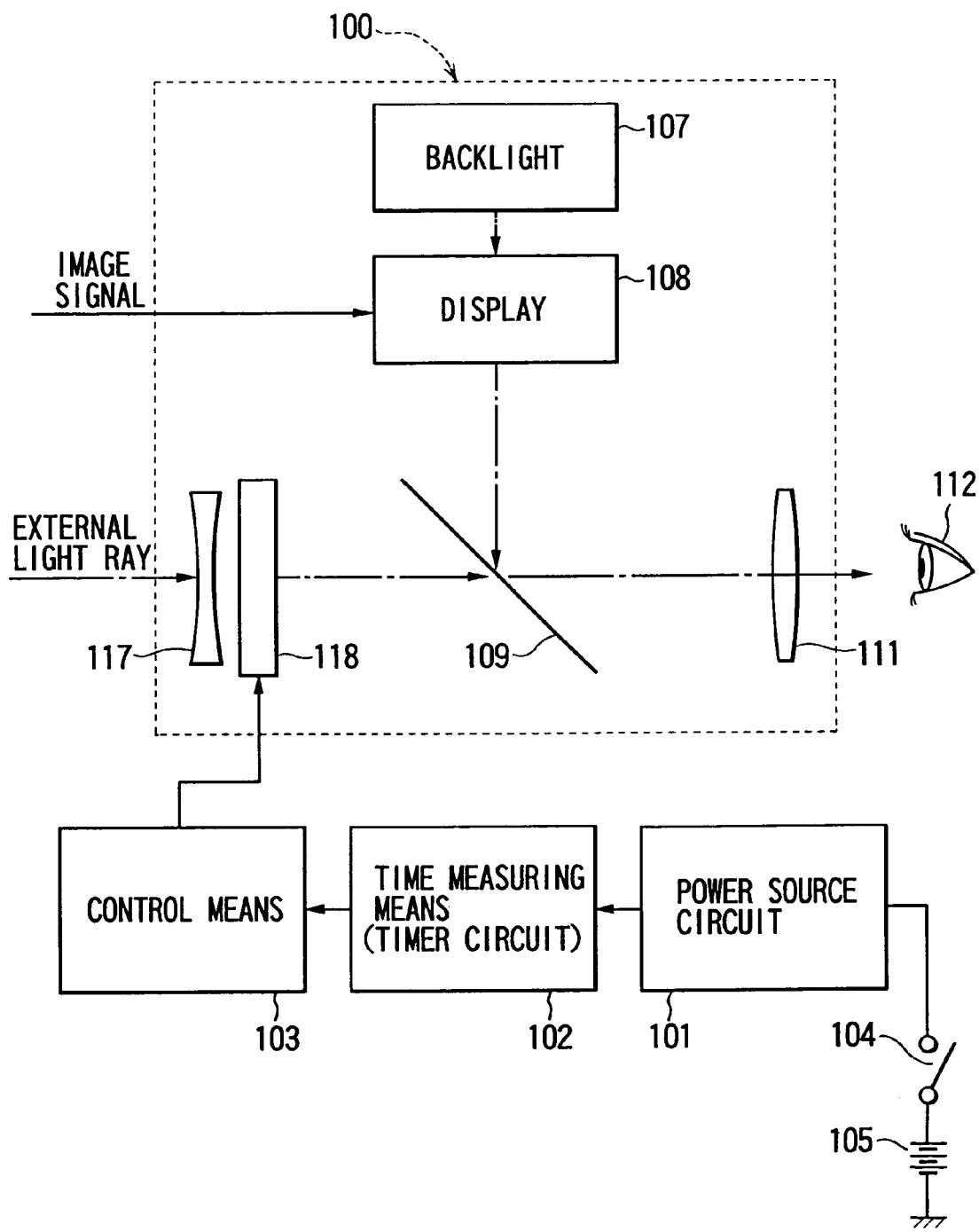
FIG. 15 is a block diagram showing the arrangement of a head-mounted type of display apparatus according to a sixth embodiment of the present invention.

The sixth embodiment of the present invention will be described below with reference to FIG. 15. FIG. 15 is a block diagram showing the arrangement of a display apparatus according to the sixth embodiment of the present invention. In FIG. 15, identical reference numerals are used to denote parts identical to those of the above-described fifth embodiment shown in FIG. 14. The display apparatus according to the sixth embodiment is of an open type as in the fifth embodiment. The arrangement shown in FIG. 15 differs from that shown in FIG. 14 in that the light controlling display 113 and the first to third polarizing plates 114, 115 and 116 are omitted from the arrangement of FIG. 14, and a light controlling (EC) filter 118 is provided between the half-mirror 109 and the concave lens 117.

The refraction of the eyepiece lens 111 is cancelled by the concave lens 117 and the light controlling filter 118 disposed on the optical axis of the external light ray, so that the eyepiece lens 111 becomes a transparent glass. If a positive voltage is applied to the light controlling filter 118, the light controlling filter 118 is brought to the state of transmitting the external light ray, whereas if a negative voltage is applied to the light controlling filter 118, the transmittance thereof lowers and the external light ray is brought to an untransmitted state. Although the amount of light of the light ray for image display from the display 108 does not vary, the amount of light of the external light ray increases and the pupil 112 of the eyeball of the user closes, so that the amount of light of an image light ray to be visually sensed by the user relatively decreases.

The light controlling operation in the arrangement of FIG. 15 will be described below. First, the power source is turned on or an image display operation is started with a positive voltage being applied to the light controlling filter 118, i.e., with a display image being visible. The way of applying this voltage is similar to the one described above in connection with the fifth embodiment.

Then, when a predetermined time elapses, the voltage applied to the light controlling filter 118 is instantly or gradually decreased by a control signal supplied from the control means 103, so that the light ray for image display is brought to the untransmitted state. The control means 103 receives time information from the time measuring means 102, and outputs a control signal and drives the light controlling filter 118 to adjust the transmittance thereof. When the time information reaches a predetermined value, the control means 103 varies the control signal and drives the light controlling filter 118 so as to increase the amount of external light and close the pupil 112 of the user, thereby relatively decreasing the amount of light of the light ray for image display.

In the sixth embodiment, the light controlling filter 118 is not limited to only an EC filter, and may be formed by a combination of the light controlling display 113 and the two polarizing plates 114 and 115 which are used in the fifth embodiment.

Seventh Embodiment

Figure 16:
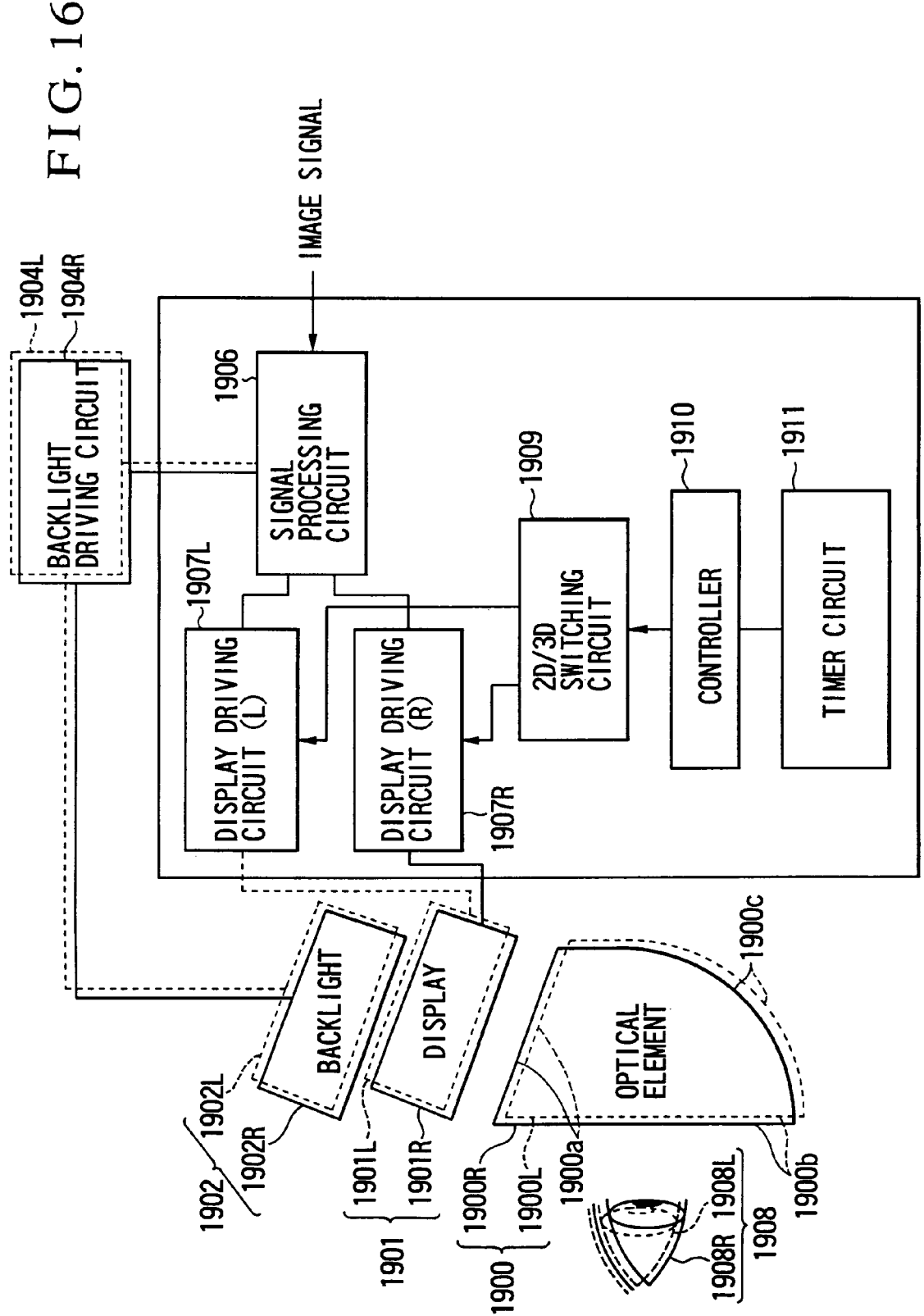
FIG. 16 is a block diagram showing the arrangement of a head-mounted type of display apparatus according to a seventh embodiment of the present invention.

The seventh embodiment of the present invention will be described below with reference to FIG. 16. FIG. 16 is a block diagram showing the arrangement of a display apparatus according to the seventh embodiment of the present invention. In FIG. 16, identical reference numerals are used to denote parts identical to those of the previously-described related art shown in FIG. 1. The arrangement shown in FIG. 16 differs from that shown in FIG. 1 in that a 2D/3D switching circuit 1909, a controller 1910 and a timer circuit 1911 are added to the arrangement of FIG. 1.

In the display apparatus according to the seventh embodiment, in a case where right and left images are alternately inputted as an image signal for each field, each display 1901R or 1901L is made to provide visual display of only a signal for a pupil 1908R of the right eye or of only a signal for a pupil 1908L of the left eye by the operation of a display driving circuit 1907R or 1907L. Thus, different images due to a parallax are displayed on the respective displays 1901R and 1901L, so that a three-dimensional image can be obtained.

During the 3D display, the user can set an arbitrary time by operating the timer circuit 1911. If the controller 1910 detects the lapse of the set arbitrary time, the display driving circuits 1907R and 1907L are operated by the 2D/3D switching circuit 1909 and switching to a 2D display is carried out.

The switching between the 2D display and the 3D display may be carried out on an image signal output side (for example, a personal computer or a player). Simply, in a field sequence switching method, the same signal may be outputted to the right and left display pictures.

Eighth Embodiment

Figure 17:
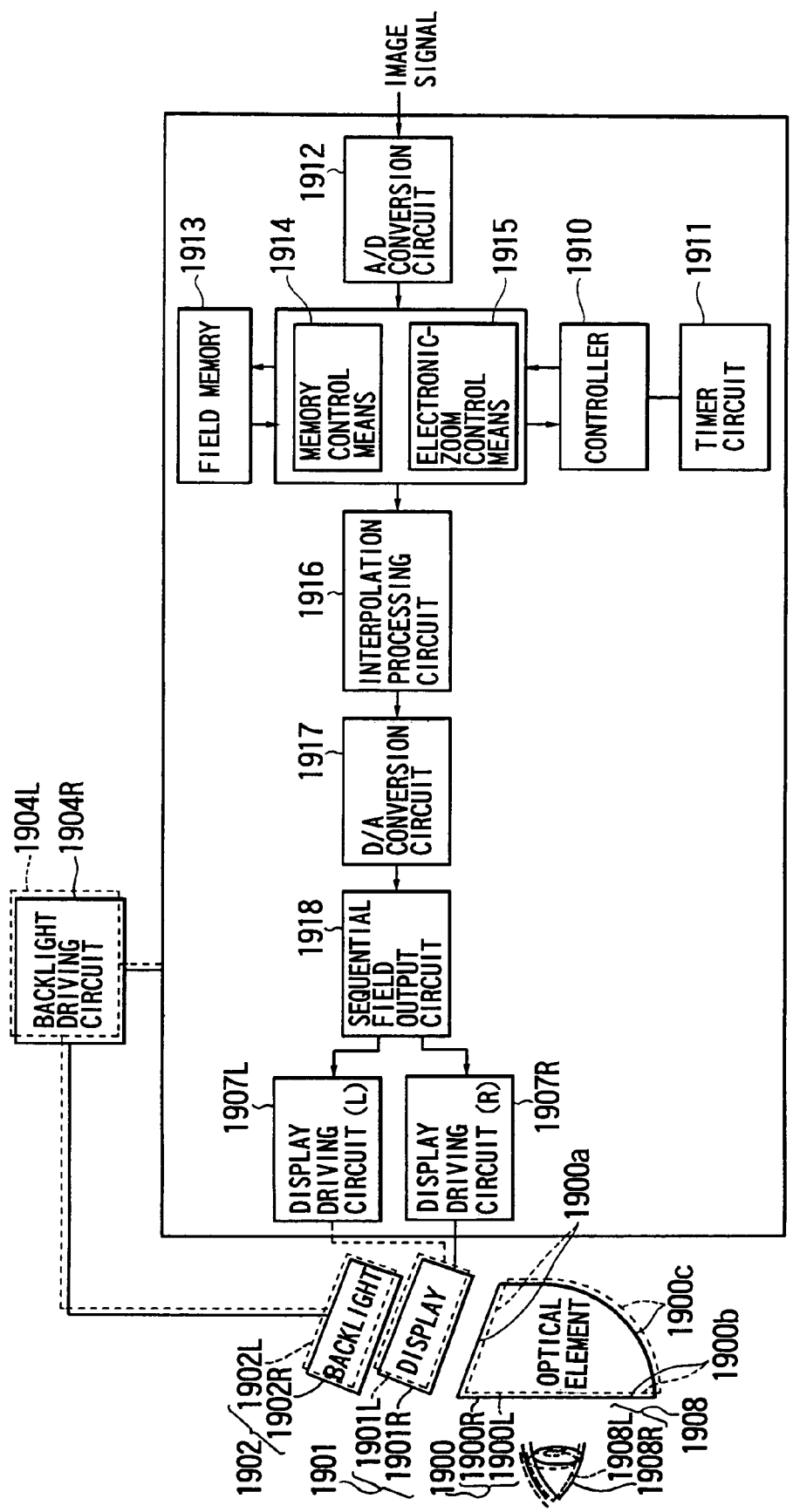
FIG. 17 is a block diagram showing the arrangement of a head-mounted type of display apparatus according to an eighth embodiment of the present invention.

The eighth embodiment of the present invention will be described below with reference to FIG. 17. FIG. 17 is a block diagram showing the arrangement of a display apparatus according to the eighth embodiment of the present invention. In FIG. 17, identical reference numerals are used to denote parts identical to those of the above-described seventh embodiment shown in FIG. 16. The arrangement shown in FIG. 17 differs from that shown in FIG. 16 in that a signal processing circuit 1906 and the 2D/3D switching circuit 1909 are omitted from the arrangement of FIG. 16 and an A (analglog)/D (digital) conversion circuit 1912, a field memory 1913, memory control means 1914, electronic-zoom control means 1915, an interpolation processing circuit 1916, a D (digital)/A (analog) conversion circuit 1917 and a sequential field output circuit 1918 are added to the arrangement of FIG. 16.

Figure 18:
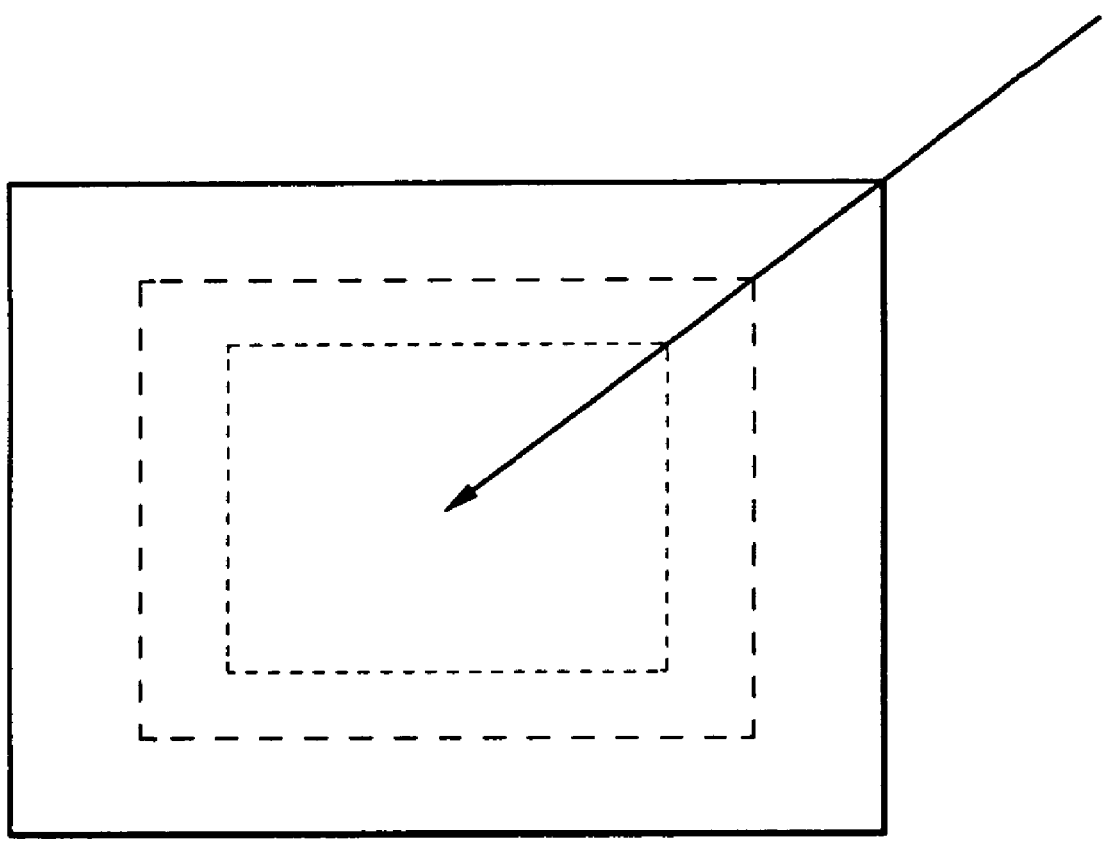
FIG. 18 is a view showing a display example of the apparatus shown in FIG. 17.

In the arrangement of FIG. 17, an image signal is A/D-converted by the A/D conversion circuit 1912, and, according to the elapsed time of the timer circuit 1911, a display picture size is changed through the field memory 1913, the memory control means 1914 and the electronic-zoom control means 1915 by the controller 1910, so that the user can be informed of the lapse of time. For example, as shown in FIG. 18, a display image is repeatedly reduced and enlarged to warn the user of the lapse of time.

Since the other operation of the eighth embodiment is the same as that of the above-described seventh embodiment, its description is omitted herein. In the eighth embodiment, the switching between 2D display and 3D display may be performed on an image signal output side (for example, a personal computer or a player).

Ninth Embodiment

Figure 19:
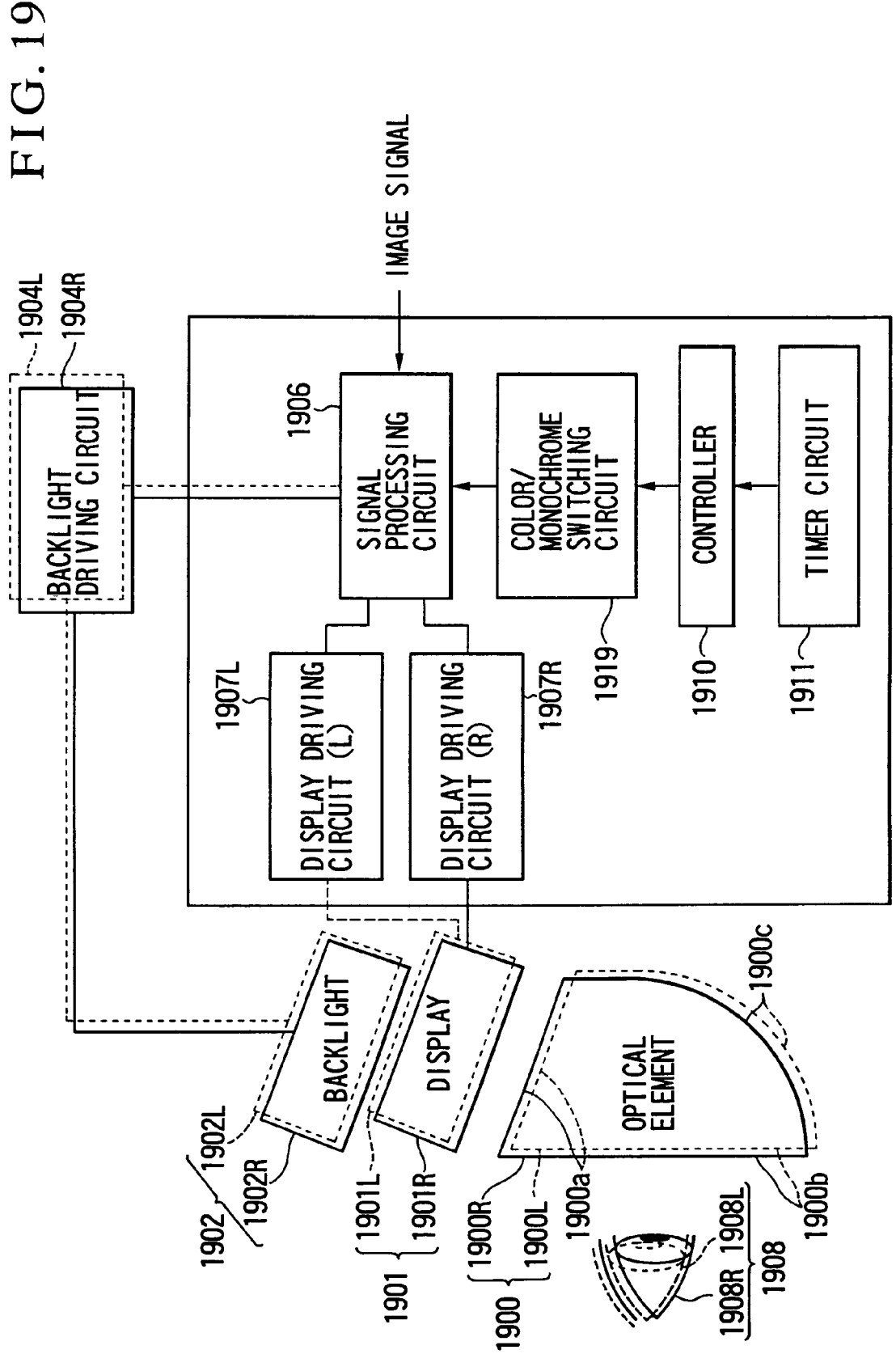
FIG. 19 is a block diagram showing the arrangement of a head-mounted type of display apparatus according to a ninth embodiment of the present invention.

The ninth embodiment of the present invention will be described below with reference to FIG. 19. FIG. 19 is a block diagram showing the arrangement of a display apparatus according to the ninth embodiment of the present invention. In FIG. 19, identical reference numerals are used to denote parts identical to those of the above-described seventh embodiment shown in FIG. 16. The arrangement shown in FIG. 19 differs from that shown in FIG. 16 in that the 2D/3D switching circuit 1909 is omitted from the arrangement of FIG. 16 and a color/monochrome switching circuit 1919 is provided instead.

In the arrangement of FIG. 19, when the elapsed time of the timer circuit 1911 reaches a set time, a color picture is switched to a monochromatic picture by the color/monochrome switching circuit 1919.

Since the other operation of the ninth embodiment is the same as that of the above-described seventh embodiment, its description is omitted herein. In the ninth embodiment, when the elapsed time of the timer circuit 1911 reaches a set time, the user may be informed of the lapse of time, as by displaying the current time or the elapsed time or by generating sound.

Any of the display apparatuses according to the embodiments described above in detail has the advantage that the user can recognize the time of use of the apparatus and be prevented from using it over a long time without noticing elapsed time, so that the user can continuously use the apparatus for the required time while recognizing the lapse of time.

In the display apparatus according to one of the present embodiments, if the user does not perform a predetermined operation when the power source is turned on or immediately after the power source is turned on, a timer time is set to a predetermined time, but if the user performs the predetermined operation, the time timer can be set to an arbitrary time. Accordingly, the user does not need to perform the awkward operation of setting the timer time each time the user activates the present apparatus, and the user can set the timer time to an arbitrary time, if necessary. The predetermined time may use a value which is uniquely determined on a system basis, or the value of a desired timer time which is arbitrarily selected and preset by the user and is stored in a memory in the state of being rewritable as required.

In the display apparatus according to one of the present embodiments, the elapsed time after the power source is turned on or after the start of image display is measured, and part of the image display is controlled on the basis of the measurement result so as to limit the amount of light visually sensed by the user. Accordingly, it is possible to prevent the user from continuously using the present apparatus over a long time which may be harmful to health.

Furthermore, in the display apparatus according to one of the present embodiments, after the lapse of a predetermined time to which the timer time is arbitrarily set by the user, image display is switched so that the user is informed of the lapse of the predetermined time. Accordingly, the user can be made to recognize the time of use of the present apparatus, and can be prevented from continuously using the present apparatus over a long time.

The invention claimed is:

1. A display apparatus comprising:
   a display unit configured to display a color image;
   a time setting unit configured to set a time, the time to be set by said time setting unit can be changed by a user;
   a detection unit configured to detect whether the time set by said time setting unit is passed; and
   an image changing unit configured to change a color image to be displayed on said display unit to a monochrome image so as to warn the user that the time set by said time setting unit is passed, if said detection unit detects that the time set by said time setting unit is passed.

2. The display apparatus according to claim 1, wherein said display unit displays a current time or an elapsed time, if said detection unit detects that the time set by said time setting unit is passed.

3. The display apparatus according to claim 1, wherein said display apparatus is capable of being mounted on a user's head.

4. The display apparatus according to claim 1, wherein said display unit includes a liquid crystal display configured to display an image, and a backlight source configured to illuminate said liquid crystal display from behind.

5. A method of controlling a display apparatus, the display apparatus including (a) a display unit configured to display a color image and (b) a time setting unit configured to set a time, the time to be set by said time setting unit can be changed by a user, said method comprising the steps of:
   detecting whether the time set by the time setting unit is passed; and
   changing a color image to be displayed on the display unit to a monochrome image so as to warn the user that the time set by said time setting unit is passed, if the time set by said the time setting unit is passed is detected.

6. The method according to claim 5, further comprising a step of displaying a current time or an elapsed time on the display unit, if the time set by the time setting unit is passed is detected.

7. The method according to claim 5, wherein the display apparatus is capable of being mounted on a user's head.

8. The method according to claim 5, wherein said display unit includes a liquid crystal display configured to display an image, and a backlight source configured to illuminate said liquid crystal display from behind.

* * * * *

UNITED STATES PATENT AND TRADEMARK OFFICE
CERTIFICATE OF CORRECTION

PATENT NO.         : 7,307,599 B2
APPLICATION NO. : 10/631935
DATED              : December 11, 2007
INVENTOR(S)       : Yasuhiro Tamekuni et al.

It is certified that error appears in the above-identified patent and that said Letters Patent is hereby corrected as shown below:

Column 9, line 3, delete "OPAL." and insert -- OPA1. --

Signed and Sealed this

Seventh Day of October, 2008

JON W. DUDAS
*Director of the United States Patent and Trademark Office*